(12) United States Patent
Dinan et al.

(10) Patent No.: US 8,576,719 B2
(45) Date of Patent: Nov. 5, 2013

(54) SYSTEM AND METHOD FOR DYNAMICALLY BALANCING A MAXIMUM NUMBER OF ACTIVE REMOTE DEVICE USERS BETWEEN BASE STATIONS

(75) Inventors: Esmael Dinan, Herndon, VA (US);
Jong-Hak Jung, Leesburg, VA (US);
Swati Tiwari, Austin, TX (US);
Hemanth Pawar, Brambleton, VA (US);
Krishna Sitaram, Chantilly, VA (US)

(73) Assignee: Clearwire IP Holdings LLC, Bellevue, WA (US)

(*) Notice: Subject to any disclaimer, the term of this patent is extended or adjusted under 35 U.S.C. 154(b) by 353 days.

(21) Appl. No.: 12/985,933

(22) Filed: Jan. 6, 2011

(65) Prior Publication Data
US 2012/0176902 A1    Jul. 12, 2012

(51) Int. Cl.
*H04L 12/26*        (2006.01)

(52) U.S. Cl.
USPC .......................................................... 370/237

(58) Field of Classification Search
None
See application file for complete search history.

(56) References Cited

U.S. PATENT DOCUMENTS

| | | | |
|---|---|---|---|
| 8,135,402 B1* | 3/2012 | Shetty et al. ................... | 455/434 |
| 2006/0166677 A1* | 7/2006 | Derakshan et al. ........... | 455/453 |
| 2008/0075178 A1* | 3/2008 | Lappetelainen et al. ...... | 375/260 |
| 2008/0102846 A1* | 5/2008 | Kim et al. ...................... | 455/450 |
| 2009/0310477 A1* | 12/2009 | Lee et al. ...................... | 370/208 |
| 2010/0080135 A1* | 4/2010 | Ishii et al. ..................... | 370/252 |
| 2011/0044266 A1* | 2/2011 | Shrivastava et al. .......... | 370/329 |
| 2011/0274071 A1* | 11/2011 | Lee et al. ...................... | 370/329 |
| 2011/0274081 A1* | 11/2011 | Chun et al. .................... | 370/330 |

* cited by examiner

*Primary Examiner* — Gregory Sefcheck
*Assistant Examiner* — Steve Young
(74) *Attorney, Agent, or Firm* — Roberts Mlotkowski Safran & Cole, P.C.

(57) ABSTRACT

Both a system and method are provided for dynamically balancing a maximum number of active remote device users that can be serviced between first and second base stations transmitting data frames in a radio communication system when the carriers of the first and second base stations operate at different radio frequency bandwidths X and Y respectively, and Y is substantially larger than X. The system includes a system control circuit that controls the number of subchannels in the uplink control channel region of the data frames transmitted by the first base station, and a traffic monitoring circuit that monitors both an uplink load and a number of active wireless device users within broadcast coverage of said first base station. The system control circuit dynamically increases the radio resources in the uplink control channel region of the frames transmitted by the first base station.

14 Claims, 8 Drawing Sheets

WiMAX Example Option 1: 5 MHz Design - 3 Symbols for control channel

UL control channel region : 3 symbols
Number of CQICH : 7
    56 active users can be supported at best
Number of ACKCH : 4
    8 DL HARQ bursts per frame can be supported
Available UL traffic symbols (DL:UL=29:18) : 15 symbols
    UL MAPL : equal to 10MHz case

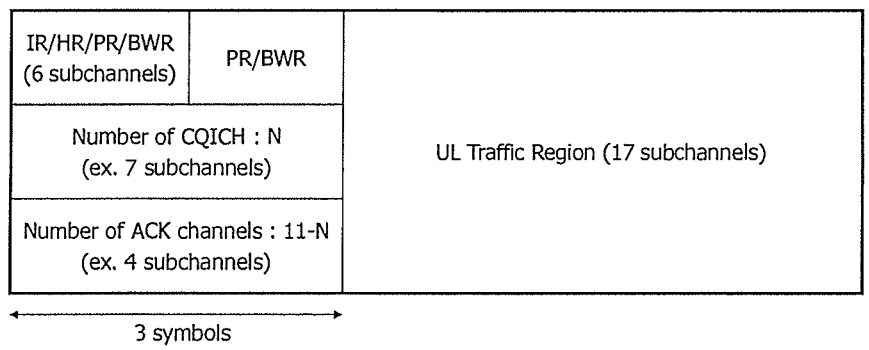

FIGURE 5

WiMAX Example Option 2: 5 MHz Design - 6 Symbols for control channel

UL control channel region : 6 symbols
Number of CQICH : 22
    100 active users can be supported
Number of ACKCH : 6
    12 DL HARQ bursts per frame can be supported
Available UL traffic symbols (DL:UL=29:18) : 12 symbols (15 → 12)
    UL MAPL : -1.76dB compared to 10MHz case
    UL sector throughput : -20% compared to 5MHz method1

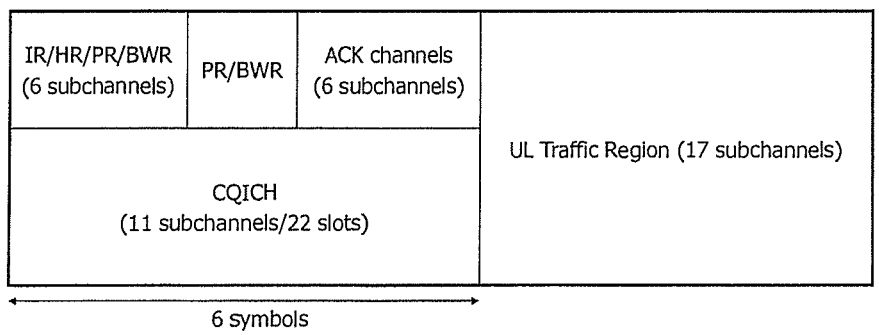

FIGURE 6

| Option - 1 (3 Symbols) | Option - 2 (6 Symbols) |
|---|---|
| More Data Capacity | Less Data Capacity |
| More Coverage | Less Coverage |
| Less users | More Users |

| Number of Active Users | UL Load | UL Coverage Issue | Decision |
|---|---|---|---|
| < 56 * bias_factor | n/a | n/a | Option-1 |
| > 56 * bias_factor | Region-2 | < Threshold | Option-2 |
| > 56 * bias_factor | Region-2 | ≥ Threshold | Option-1 |
| > 56 * bias_factor | Region-3 | n/a | Option-1 |
| > 56 * bias_factor | Region-1 | n/a | Option-2 |

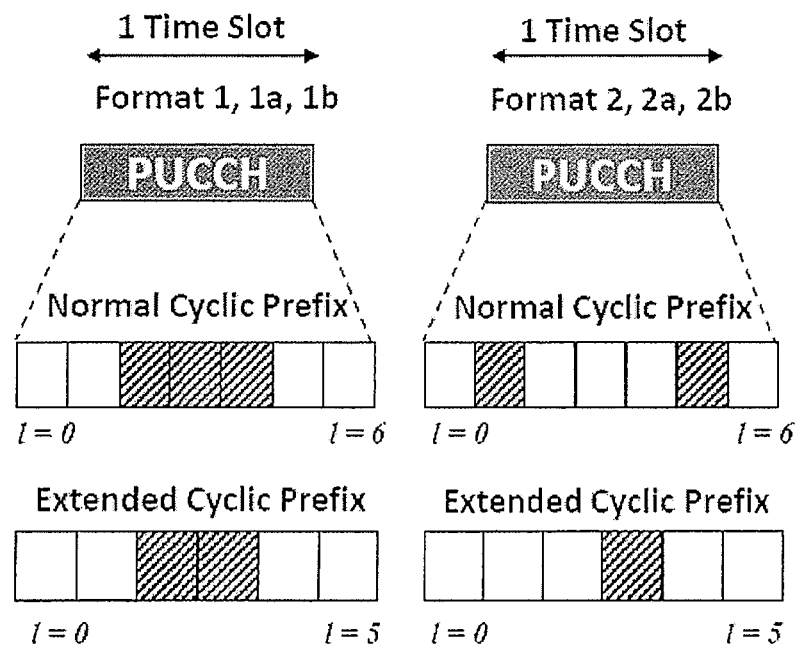
FIGURE 11B

More Data Capacity    Less Data Capacity

Less Users    More Users

SYSTEM AND METHOD FOR DYNAMICALLY BALANCING A MAXIMUM NUMBER OF ACTIVE REMOTE DEVICE USERS BETWEEN BASE STATIONS

FIELD OF THE INVENTION

This invention generally relates to wireless communication systems and is specifically concerned with a system and method for dynamically balancing a maximum number of active remote device users between base stations in radio network that have substantially different frequency bandwidths.

BACKGROUND OF THE INVENTION

Conventional wireless communication systems provide wireless connectivity between remote devices such as mobile stations using radio access networks (RANs) formed from a plurality of radio transceiver stations with overlaying coverage that include wireless access points, base stations, base station routers, and the like. A remote device may establish a wireless communication link over an air interface with a RAN that is a communicatively coupled to a network. The remote device may be, for example, a mobile station that uses the wireless communication link to access services provided by the network such as establishing a communication session with another mobile station. The information transmitted in the communication session between the two mobile stations may be analog or digital information and the communication path between the mobile stations may be formed using a circuit-switched architecture or a packet-switched architecture. In this application, we are concerned with packet-switched architectures that divide the information up into data packets that can be transmitted along numerous paths between the two remote devices. Different wireless access technologies may be used to support packet data applications. Some exemplary wireless access technologies include WiFi, third generation (3G) technologies such as EvDO, and fourth generation (4G) technologies such as LTE and WiMAX.

Each of the transceiver stations in the RAN is capable of supporting one or more radio carriers that operate at different frequency bandwidths. For example, in a RAN implementing WiMAX technology, the carriers transmitted by the transceiver stations may operate at frequency bandwidths of 1.25 MHz, 2.5 MHz, 5 MHz, 10 MHz or 20 MHz.

The frequency bandwidth of the carrier determines the number of subchannels available for constructing the individual data packets (hereinafter referred to as data frames). Each data frame includes an uplink control channel region formed from some of the subchannels of the carrier, and an uplink traffic region formed from other subchannels of the carrier. In a WiMAX system where the carrier operates at a 10 MHz frequency bandwidth, the carrier may provide a total of 70 subchannels, 35 of which may be dedicated to the uplink control channel region for identifying the users, monitoring the quality of the signal, and acknowledging receipt of the signal, the remaining 35 of which may be dedicated to the downlink traffic region for delivering the data payload of the data frame, which may be for example a portion of a voice file. Because a larger frequency bandwidth provides a larger number of available subchannels on the carrier, the frequency bandwidth also determines both the maximum number of active remote device users that can be accommodated at any one time, as well as the amount of coverage that the carrier can provide for the simple reason that there are more subchannels available in each data frame for controlling both the delivery of the information as well as the amount of information delivered. Hence the maximum number of active users and the coverage that can be serviced by a carrier operating at a frequency bandwidth of 10 MHz is substantially greater than that of a carrier operating at a frequency bandwidth of 5 MHz.

SUMMARY OF THE INVENTION

The applicants have observed that coverage problems may arise in RANs employing overlay carriers transmitted by different base stations operating at different frequency bandwidths as a result of the differences in the maximum number of active users that can be serviced. Specifically, when the number of active users serviced in a particular region is less than the maximum number than can be serviced by the carrier having a greater frequency bandwidth, but greater than the maximum number that can be serviced by the carrier having a smaller frequency bandwidth, service interruptions can occur. Such service interruptions may for example take the form of dropped calls or blocked calls between mobile stations operating in the region covered.

Federal regulations presently allow Internet service providers to select how much of the available radio resources (e.g. time slots, subchannels) of their carriers are dedicated to the uplink control channel region of the frames verses the uplink traffic channel region of the frames. As the maximum number of users serviceable by a carrier may be increased by increasing the amount of radio resources dedicated to the uplink control region of the data frames, such a control-region heavy allocation of subchannels in the data frames would appear at first glance to provide a solution to the aforementioned problem, since the resulting maximum number of users for the carrier operating at the lesser frequency bandwidth could be made to equal, or at least approach, the maximum number of users that can be serviced by the overlaying carrier operating at a larger frequency bandwidth. However, the trade-off for such a solution is a reduction in the coverage of the carrier. Consequently, such a solution technique is only effective under light to moderate uplink loading conditions, as the same number of service interruptions that occurs under heavy uplink loading conditions remains the same regardless of the allocation of radio resources between the uplink control channel region and the uplink traffic channel region in the data frames. Accordingly, there is a need for a system and method capable of dynamically balancing a maximum number of active remote users between base stations which considers both the number of active users being serviced by the different base stations as well as the uplink loading conditions.

The invention is both a system and method for dynamically balancing a maximum number of active remote users between first and second base stations whose carriers have different frequency bandwidths X and Y in order to minimize interruptions of service. To this end, the system of the invention includes a control circuit that controls the amount of radio resources dedicated to the uplink control channel region of the data frames transmitted by the first base station, and a traffic monitoring circuit that monitors a number of active wireless device users within broadcast coverage of said first base station, wherein the system control circuit increases the resources (e.g. time slots, subchannels) dedicated to the uplink control channel region of the frames transmitted by said first base station to increase the number of users that said first base station can support to equal or at least approach a maximum number of users the second base station can support when the number of active wireless device users of the first base station exceeds a first preselected number.

Preferably, the traffic monitoring circuit also monitors an uplink load for said first base station, and the system control circuit increases the amount of radio resources in the uplink control channel region of the frames transmitted by the first base station when the number of active wireless device users exceeds the first preselected number and the uplink load is below a first preselected threshold indicative of a low load condition.

The system control circuit may refrain from increasing the amount of radio resources dedicated to the uplink control channel region of the frames transmitted by the first base station when the number of active wireless device users exceeds said first preselected number and said uplink load is above a second preselected threshold indicative of a high load condition.

The system control circuit may further increase the amount of radio resources allocated to uplink control channel region of the frames transmitted by the first base station when the uplink load is between the first and second thresholds, the number of active wireless device users exceeds said first preselected number, and a number of uplink bursts transmitted for the lowest modulation control scheme divided by the total number of bursts is less than a preselected percentage. However, the system control circuit may refrain from increasing the amount of radio resources in the uplink control channel region when the number of uplink bursts transmitted for the lowest modulation control scheme divided by the total number of bursts is equal to or greater than said preselected percentage.

Preferably, the system control circuit decreases the amount of radio resources allocated to the uplink control channel region of the frames transmitted by the first base station when the number of active wireless device users falls below a second preselected number that is lower than said first preselected number.

Finally, the invention includes a method for dynamically balancing a maximum number of active remote device users between first and second base stations in a radio communication system having broadcast coverage operating at radio frequency bandwidths X and Y respectively, wherein Y is substantially larger than X, and wherein the first and second base stations transmit data frames, each of which includes an uplink control channel region and an uplink channel region. The method includes the steps of monitoring both an uplink load and a number of active wireless device users within the broadcast coverage of the first base station, and increasing the amount of radio resources in the uplink control channel region of the frames transmitted by said first base station to increase the number of users that said first base station can support to equal or at least approach a maximum number of users the second base station can support when the number of active wireless device users of said first base station exceeds a first preselected number and said monitored uplink load is below a first preselected threshold.

Both the system and the method of the invention are applicable to WiMAX and LTE RANs. In the case of WiMAX, the system control circuit increases the time slots in the uplink control channel region; in the case of LTE, the system control circuit increases the subchannels in the uplink control channel region.

BRIEF DESCRIPTION OF THE DRAWINGS

The disclosure is further explained in the description that follows with reference to the drawings illustrating, by way of non-limiting examples, various embodiments wherein:

FIG. 5 is a frequency/time graph of a WiMAX data frame broadcast by a carrier having a 5 MHz frequency bandwidth, illustrating how the time slots and subchannels may be allocated between the uplink control channel region and the uplink data channel region;

FIG. 6 illustrates how the allocation of time slots and subchannels may be changed in the uplink control channel region in the frequency/time graph of FIG. 5 to increase the maximum number of remote users that can be serviced;

FIGS. 11A, 11B and 11C illustrate the application of the method of the invention to the data frames of an LTE system.

DETAILED DESCRIPTION OF THE EMBODIMENTS

Figure 1:
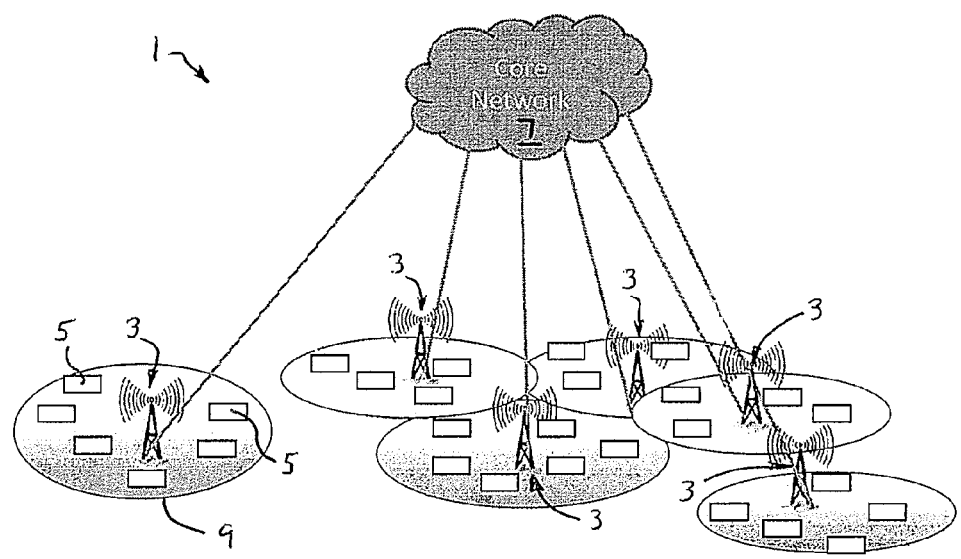
FIG. 1 is a schematic diagram generally illustrating the system of the invention in the context of a RAN.
Figure 2:
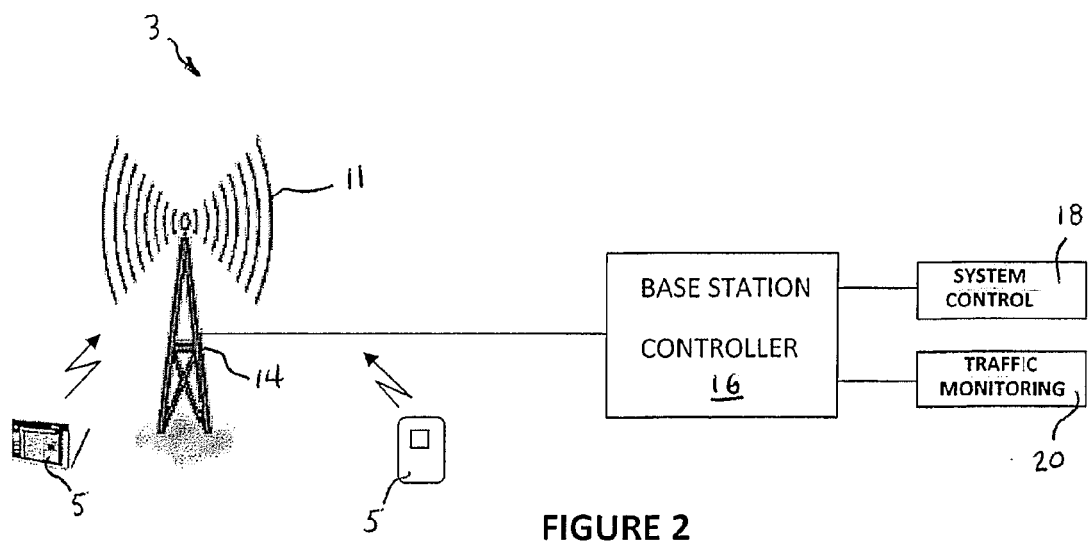
FIG. 2 is a schematic diagram of one of the base stations of the system, illustrating in particular the system control circuit and the traffic monitoring circuit of the base stations of the system.

As schematically illustrated in FIGS. 1 and 2, the system 1 of the invention comprises improved base stations 3 of a wireless local area network (LAN) that provides a radio communication link between remote device users 5 and a core network 7. The remote devices may be, for example, mobile phones or computers that are linked to the base stations via a WiFi, WiMAX or LTE port as indicated in FIG. 2. Each of the base stations 3 provides a radio link between all of the remote devices 5 within its area by way of its particular carrier 11. The coverages 9 provided by the various carriers 11 overlay one another in order to in order to provide continuous coverage to remote device users 5 traveling through the geographical area serviced by the LAN. Although the coverages 9 of the various base stations 3 are indicated as being static, the sizes of these coverages 9 can vary depending on the particular allocation of radio resources between the uplink control and uplink data channel regions of the data frames transmitted by the carrier 11.

As is specifically shown in FIG. 2, each of the base stations 3 of the system 1 of the invention includes a base transceiver station (BTS) 14 for receiving and broadcasting the carrier 11, and a base station controller (BSC) 16 which controls the base transceiver station 14. The BSC 16 receives quality of signal measurements from the mobile phones or other remote devices 5, controls handovers from BTS 14 to BTS 14 for mobile devices moving through the LAN, and most importantly for this application, handles the allocation of radio subchannels in the data frames transmitted by the carriers 11. To this end, the base station 3 of the system 1 includes both a system control circuit 18, and a traffic monitoring circuit 20 connected to the BSC 16. As will be described in more detail later, the system control circuit 18 dynamically instructs the BSC 16 as to how the radio resources of the carrier 11 should be allocated based upon the uplink data load and number of remote device users detected by the traffic monitoring circuit 20. While the system control circuit 18 and the traffic control circuit 20 are illustrated as being separate from the base station controller 16, both of these circuits 18 and 20 may of course be integrated into the base station controller 16.

Figure 3:
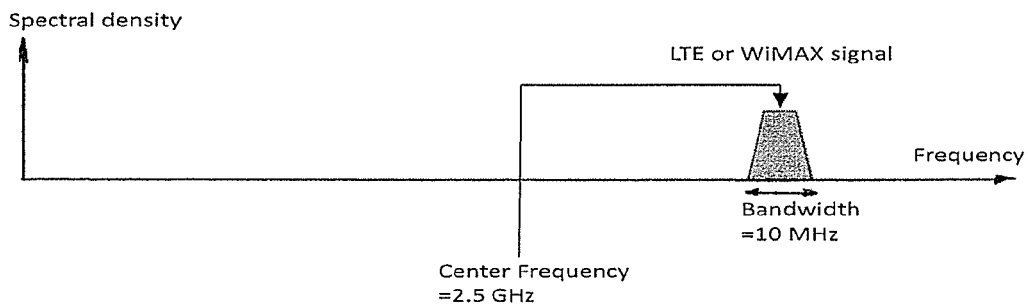
FIG. 3 is a graph illustrating the relationship between the frequency bandwidth of the carrier of the base station and the broadcast frequency of the carrier.

FIG. 3 is a graph illustrating the relationship between the frequency bandwidth of the carrier 11 of the base station 3 and the broadcast frequency of the carrier 11. While the center broadcast frequency in this example is 2.5 GHz, broadcast frequencies for both WiMAX and LTE carriers may vary from the high MHz to the low GHz. The frequency bandwidth (Illustrated as a trapezoid) determines how many subchannels the carrier 11 will have to allocate between the uplink control and uplink data channel regions of the data frames transmitted by the carrier 11. While in this example the frequency bandwidth for the carrier is 10 MHz, bandwidths of 1.25, 2.5, 5, 10, and 20 MHz are presently available for WiMAX carriers, while frequency bandwidths of 1.4, 3, 5, 10, 15, and 20 MHz are available for LTE carriers. The available number of subchannels varies roughly linearly with the frequency bandwidth. Specifically, 181, 301, 601, 901 and 1201 subchannels are available for frequency bandwidths of 1.4, 3, 5, 10, 15, and 20 MHz, respectively.

Figure 4:
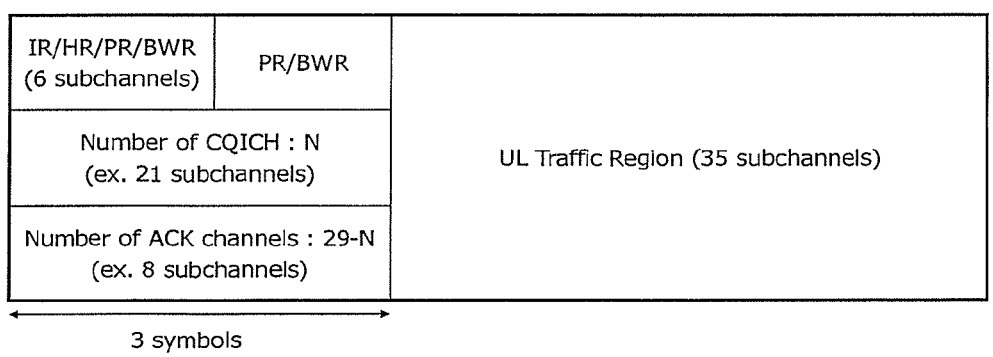
FIG. 4 is a frequency/time graph of a WiMAX data frame broadcast by a carrier having a 10 MHz frequency bandwidth, illustrating how the time slots and subchannels may be allocated between the uplink control channel region and the uplink data channel region.

FIGS. 4 and 5 are frequency/time graphs of a WiMAX data frame broadcast by different overlaying carriers 11 having 10 MHz and 5 MHz frequency bandwidths, respectively. A comparison of these graphs illustrates the limitations of the carrier having a 5 MHz bandwidth relative to the carrier having the 10 MHz when the same percentage region of the data frames of each is allocated to the uplink control channel region (i.e. 3 symbols). In both cases, the uplink control channel region includes channel quality indicator channels (CQICH), acknowledgement channels (ACKCH), and other subchannels (IR/HR/PR/BWR) dedicated to the identification and management of the data frames transmitted by the base stations. However, because the number of subchannels and time slots available for the 10 MHz carrier is roughly twice that of the subchannels available for the 5 MHz carrier, the maximum number of users that the 10 MHz carrier can support (i.e. 100 remote device users in this example) is almost double that of what the 5 MHz carrier can support (i.e. 56 remote device users) when 3 symbols are allocated to the uplink control channel region for the data frames of both carriers.

FIG. 6 illustrates how the allocation of time slots and subchannels in the data frame of FIG. 5 may be changed to increase the maximum number of remote users that can be serviced. Specifically, in the FIG. 6 data frame, when the number of symbols is changed from 3 to 6, the number of time slots in the uplink control channel region doubles from 11 to 22, and the number of subchannels is increased. Two more subchannels (ACK) are dedicated to acknowledgement (i.e. 6 vs. 4 channels) and four more subchannels (CQICH) are dedicated to channel quality indication (i.e. 11 vs. 7 channels). In this example, such an increased allocation of radio resources to the uplink control channel region increases the maximum number of remote users that the 5 MHz carrier can service from 56 to 100 users, which is equal to the maximum number of remote device users that can be serviced by the 10 MHz carrier when 3 symbols are allocated to the uplink control channel region.

Figures 7, 8, 9:
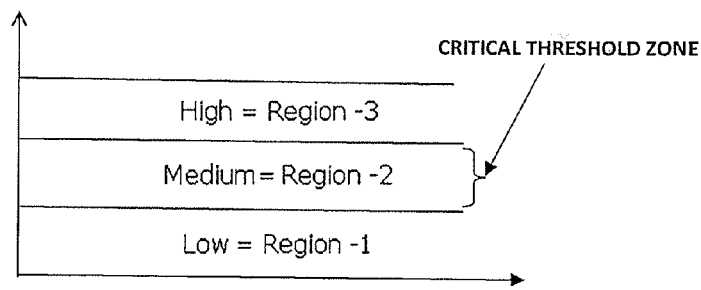
FIG. 7 is a table illustrating the trade-off between coverage and the maximum number of users that occurs as a result of the different allocation of time slots and subchannels in the frequency/time graph of a WiMAX data frame illustrated in FIGS. 5 and 6.
FIG. 8 is a table illustrating the relationship between the uplink traffic load and the feasibility of changing the allocation of time slots subchannels in the data frames in order to reduce service interruptions between the remote users serviced by the system.
FIG. 9 is a decision table illustrating the decision algorithm implemented by the system of the invention to dynamically allocate radio resources between the uplink control channel region and the uplink data channel region of the data frames depending upon the number of remote device users and the uplink traffic load sensed by the traffic monitoring circuit of the base stations.

FIG. 7 illustrates the trade-off associated with changing the data frame configuration of the 5 MHz carrier from FIG. 5 to FIG. 6. Because more radio resources are allocated to the uplink control channel region, fewer radio resources are available for the uplink traffic channel region that carries the data payload of the data frames. Hence, while more users may be accommodated with the data frame configuration of FIG. 6, the carrier necessarily has less data capacity than before, and a reduced amount of coverage. Consequently, when the uplink loading condition of the 5 MHz carrier is high, increasing the radio resources in the uplink control channel region of the data frame as illustrated in FIG. 6 will not effectively reduce service interruptions in a RAN having overlaying 10 MHz and 5 MHz carriers. In such a case, the same number of service interruptions that occurred as a result of the lesser maximum number of remote device users serviceable by the 5 MHz carrier with the FIG. 5 data frame configuration will now occur as a result of the lesser data capacity and coverage with the FIG. 6 data frame configuration. By contrast, when the uplink loading condition of the 5 MHz carrier is low, changing the data frame configuration from FIG. 5 to FIG. 6 to increase the maximum number of remote device users will always reduce the number of service interruptions, since the 5 MHz carrier can easily handle low uplink loading conditions despite its diminished data capacity and lesser coverage.

Consequently, as indicated in FIG. 8, a critical coverage threshold exists within the zone of medium loading conditions that is decisive as to whether or not to increase the maximum number of remote device users in a carrier having a smaller frequency bandwidth to equal or at least approach the maximum number of remote device users in an overlaying, higher bandwidth carrier. A change in the data frames from the FIG. 5 to the FIG. 6 configuration should always be made under uplink loading conditions that are below a critical coverage threshold in the region of medium uplink loading, as an increase in the radio resources in the uplink control channel region of the data frames to increase the maximum number of users will always reduce service interruptions. Conversely, there should be no change in the data frames from the FIG. 5 to the FIG. 6 configuration under uplink loading conditions that are above such a critical threshold, as an increase in the radio resources in the uplink control channel region of the data frames will not reduce service interruptions.

FIG. 9 is a decision table reflective of the method of the invention implemented by the system 1 in determining whether the system control circuit 18 should change the uplink traffic channel region of the data frames of the 5 MHz carrier from the FIG. 5 (Option 1) 3 symbol configuration to the FIG. 6 (Option 2) 6 symbol configuration that takes into consideration both the number of active users and the uplink loading conditions monitored by the traffic monitoring circuit 20. This decision table assumes that the data frame configuration is initially set to the FIG. 5 (Option 1) 3 symbol configuration, wherein the maximum number of users in this example is 56.

As indicated by the top row of the table, when the number of users serviced by the 5 MHz carrier is less than its maximum number of 56 users times a bias factor, the system control circuit 18 maintains the FIG. 5 (Option 1) 3 symbol configuration since the 5 MHz carrier can easily service such a number of users without interruptions. The use of a bias factor (which is preferably in a range of between about 0.80 and 0.090) adds a degree of robustness to the method of the invention by insuring that the transition from the FIG. 5 (Option 1) 3 symbol configuration to the FIG. 6 (Option 2) 6 symbol configuration occurs before the maximum user limit is so closely approached that service interruptions might occur.

As indicated by the bottom row of the table, when the number of users times the bias factor exceeds the maximum number of users, and the uplink loading conditions detected by the traffic monitoring circuit 20 are light (Region 1), then the system control circuit 18 changes data frames of the 5 MHz carrier from the FIG. 5 (Option 1) 3 symbol configuration to the FIG. 6 (Option 2) 6 symbol configuration. As indicated by the penultimate row of the table, when the number of users times the bias factor exceeds the maximum number of users, and the uplink loading conditions detected by the traffic monitoring circuit 20 are heavy (Region 3), then the system control circuit 18 will refrain from changing the data frames of the 5 MHz carrier from the FIG. 5 (Option 1) 3 symbol configuration to the FIG. 6 (Option 2) 6 symbol configuration, as such a change would not make any significant difference in the amount of service interruptions (which may, for example, take the form of dropped or blocked mobile phone calls).

Finally, as is indicated by the second and third row of the decision table, when the number of users times the bias factor exceeds the maximum number of users, and the uplink loading conditions detected by the traffic monitoring circuit 20 are medium (Region 2), then the system control circuit 18 may or may not change the data frame configuration from the FIG. 5 (Option 1) 3 symbol configuration to the FIG. 6 (Option 2) 6 symbol configuration. Whether or not such a change is made is dependent upon whether the change would surpass a critical coverage threshold under the FIG. 6 (Option 2) 6 symbol configuration that would effectively negate any advantage in making such a change.

Figure 10:
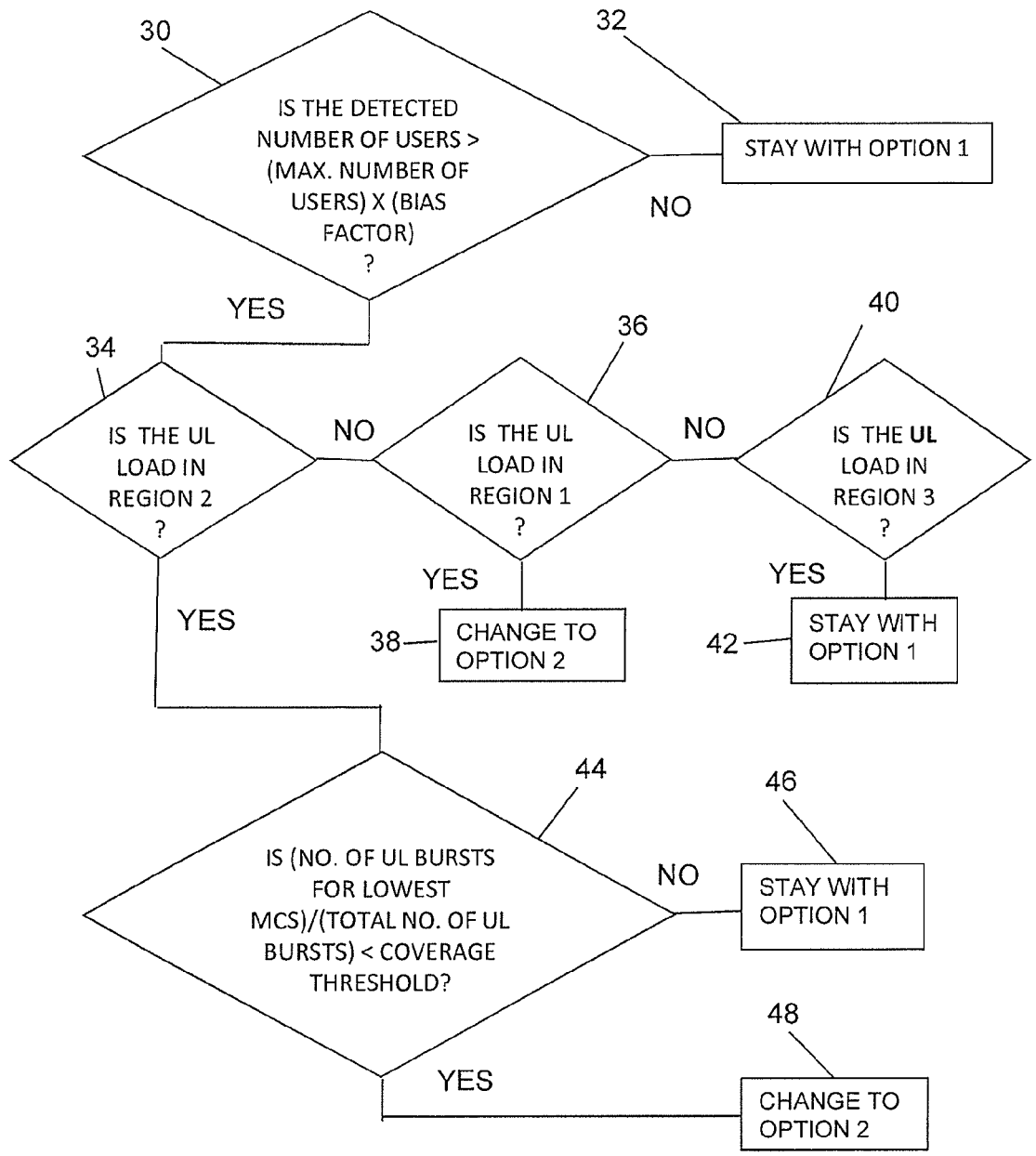
FIG. 10 is a flow chart illustrating a method of implementing the decision algorithm of the invention.

FIG. 10 is a flow chart that indicates the method steps for determining whether the critical coverage threshold has been surpassed in the context of the decision table of FIG. 9. These method steps are preferably implemented by a digital processor of the base station controller 16 via appropriate software recorded on a computer-readable medium. As blocks 30 and 32, and blocks 36, 38, 40 and 42 correspond to the previously discussed first, last, and next-to-last rows of the table of FIG. 9, no detailed discussion of these blocks is necessary. As indicated in inquiry block 34, when the uplink load is in region 2, the algorithm in inquiry block 44 is determinative as to whether or not the critical coverage threshold has been surpassed. Specifically, block 44 inquires whether or not the number of uplink bursts for the lowest modulation control scheme (MCS) divided by the total number of uplink bursts is less than the coverage threshold. It should be noted that the base station controller 16 will modulate an increasing number of the uplink bursts transmitted over the subchannels of the carrier with the lowest modulation scheme as the uplink data load increases, as the lowest modulation scheme allocates the most amount of data to be delivered by the traffic channel region of the data frames. The coverage threshold corresponds to a fraction between 0 and 1, wherein lower values indicate that satisfactory coverage and data capacity is present, and higher values indicate that unsatisfactory coverage and data capacity is either imminent or has already occurred. In this example, the coverage threshold is set at a value of 0.70. Such a coverage threshold value indicates that that the base station controller is employing the lowest modulation control scheme for 70% of the remote device users in an attempt to order to keep up with the uplink data load, and that a saturation condition is eminent. Accordingly, if the answer to the inquiry of whether or not the number of uplink bursts for the lowest modulation control scheme (MCS) divided by the total number of uplink bursts is less than 0.70 is "yes" then the system control circuit 18 stays with Option 1 (block 46). If the answer to this inquiry is "no", then the system control circuit 18 changes to Option 2 (block 48).

The digital processor of the base station controller 16 continuously executes the decision table of FIG. 9 and the flow chart of FIG. 10 every fraction of a second. While not specifically shown in either FIG. 9 or FIG. 10, the method implemented by the system 1 of the invention includes further steps to avoid a rapid switching back-and-forth between the Option 1 and Option 2 data frame configurations. Specifically, in the circumstance where the system control circuit 18 has changed the data frame configuration from Option 1 to Option 2 because the maximum number of active users times the bias factor has been exceeded, but the number of users has dropped back below the maximum number of active users times the bias factor, the bias factor is preferably changed to a second, lower value to prevent rapid Option 1/Option 2 switching in a case where the number of active users "hovers" at a value equal to the maximum number of users times the first bias factor. For example, if the first bias factor is selected to be between about 75% and 85%, then the second bias factor should be between about 60% and 75%, with at least a 5% difference between the two bias factors. Similarly, in a situation where inquiry block 44 has determined that the selected coverage threshold of 0.70 has been met or exceeded and therefore refrains from changing the data frame configuration from Option 1 to Option 2, the coverage threshold is preferably changed to a lesser number such as 0.65 before inquiry block 44 will change the data frame configuration from Option 1 to Option 2.

Figure 11A:
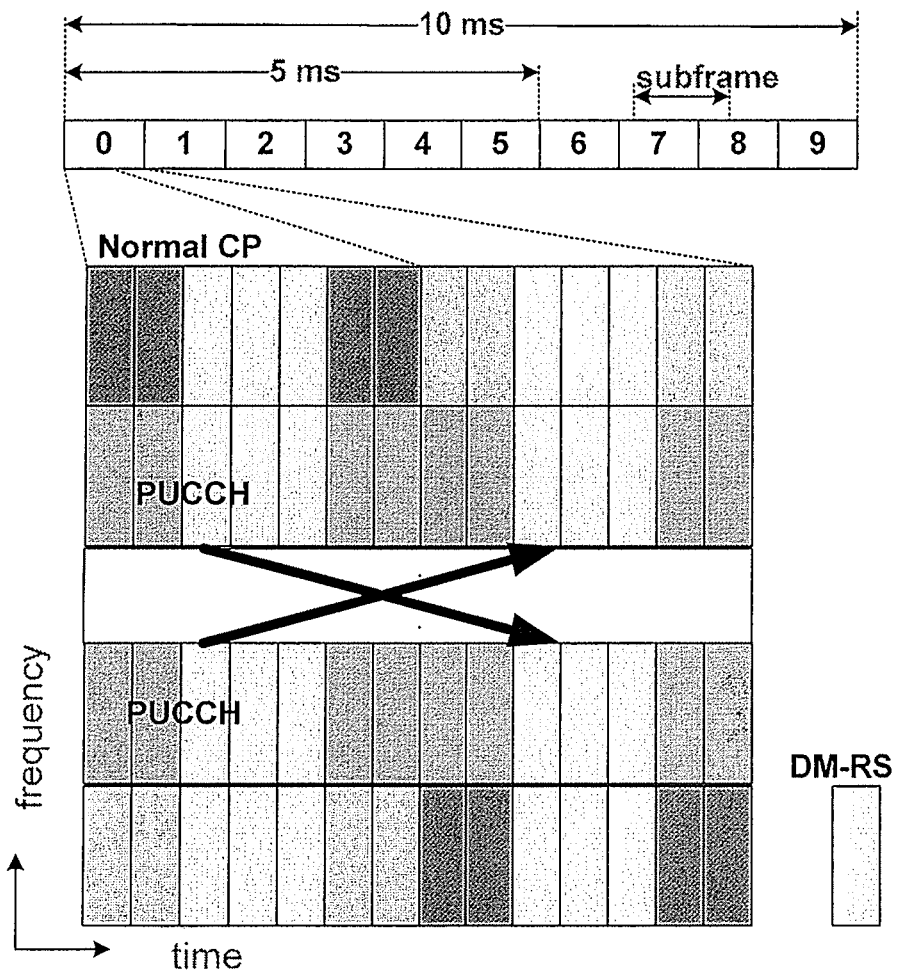
Figure 11C:
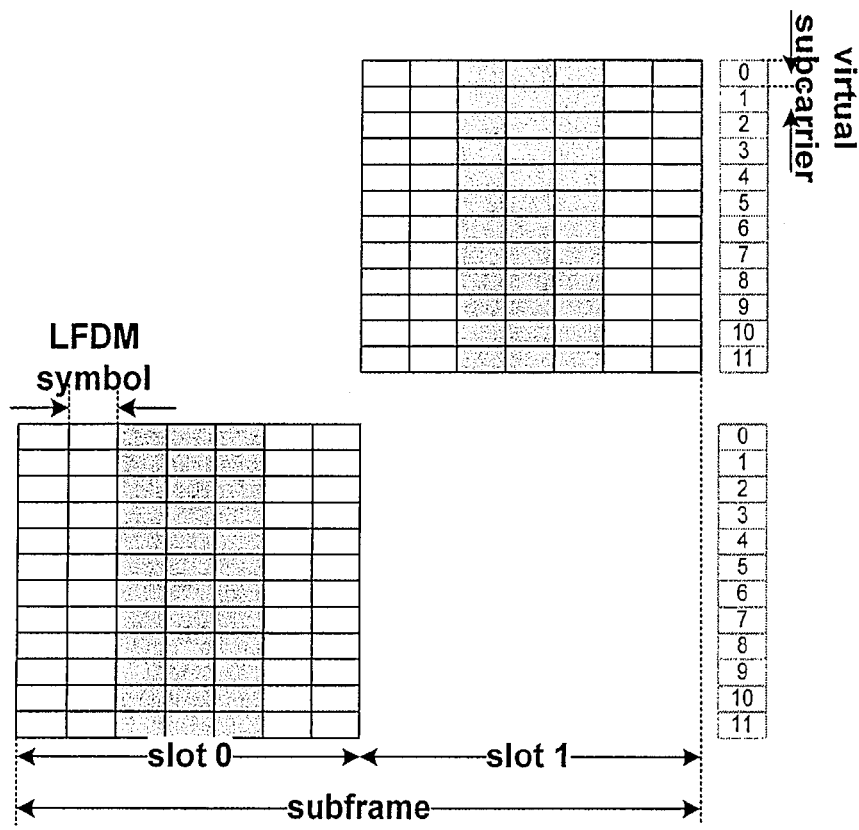
Figure 12:
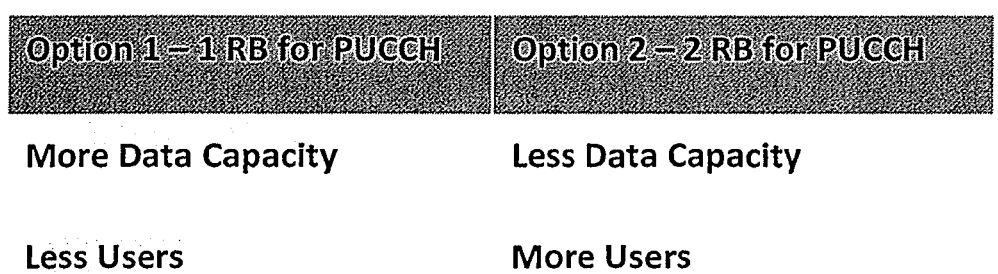
FIG. 12 is a table illustrating the trade-off between coverage and the maximum number of users that occurs as a result of the different allocation of resource blocks in the frequency/time graph of the LTE data frames illustrated in FIGS. 11A-11C.

FIGS. 11A, 11B and 11C illustrate the application of the system 1 and method of the invention to a RAN employing LTE carriers. In the case of LTE data frames, the uplink control channel region of the data frames corresponds to the physical uplink control channel or PUCCH in the frames. Analogous to the previously discussed allocation of 3 or 6 symbols the uplink control channel region previously discussed in the WiMAX example, the PUCCH may include for example either one or two resource blocks. The allocation of one resource block for the PUCCH allows for more data capacity but fewer users. Conversely, the allocation of two resource blocks the PUCCH allows for more users but less data capacity and less coverage, as indicated in the table of FIG. 12. The same decision table and flow chart illustrated in FIGS. 9 and 10, respectively are used to determine when to change of the data frames to increase or to withhold an increase of the resource blocks of the PUCCH from one resource block to two. Additionally, to avoid rapid back-and-forth change of the configuration of the LTE data frames, the same changing of the bias factor and the coverage threshold to an at least 5% lesser value is employed, as described in the previous paragraph.

All patents, test procedures, and other documents cited herein, including priority documents, are fully incorporated by reference to the extent such disclosure is not inconsistent and for all jurisdictions in which such incorporation is permitted While the illustrative embodiments disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

We claim:

1. A system for dynamically balancing a maximum number of active remote device users that can be serviced between first and second base stations transmitting data frames via carriers in a radio communication system, wherein the carriers of the first and second base stations operate at different radio frequency bandwidths X and Y respectively, wherein Y is substantially larger than X, comprising:
    a system control circuit that controls an amount of radio resources in an uplink control channel region of the data frames transmitted by the first base station, and
    a traffic monitoring circuit that monitors a number of active wireless device users within broadcast coverage of said first base station,
    wherein the system control circuit increases the amount of radio resources in the uplink control channel region of the frames transmitted by said first base station to increase the number of users that said first base station can support to equal or at least approach a maximum number of users the second base station can support when the number of active wireless device users of the first base station exceeds a first preselected number,
    wherein the traffic monitoring circuit also monitors an uplink load for said first base station, and the system control circuit increases the amount of radio resources in the uplink control channel region of the frames transmitted by the first base station when the number of active wireless device users exceeds said first preselected number and said uplink load is below a first preselected threshold indicative of a low load condition,
    wherein the system control circuit refrains from increasing the amount of radio resources in the uplink control channel region of the frames transmitted by the first base station when the number of active wireless device users exceeds said first preselected number and said uplink load is above a second preselected threshold indicative of a high load condition, and
    wherein the system control circuit increases the amount of radio resources in the uplink control channel region of the frames transmitted by the first base station when the uplink load is between said first and second thresholds, the number of active wireless device users exceeds said first preselected number, and a number of uplink bursts transmitted for a lowest modulation control scheme divided by a total number of bursts is less than a preselected percentage, but refrains from increasing the amount of radio resources in the uplink control channel region when said number of uplink bursts transmitted for the lowest modulation control scheme divided by the total number of bursts is equal to or greater than said preselected percentage.

2. The system of claim 1, wherein the system control circuit decreases the amount of radio resources in the uplink control channel region of the frames transmitted by said first base station when the number of active wireless device users falls below a second preselected number that is lower than said first preselected number.

3. The system of claim 2, wherein said first preselected number is between about 75-85% of the maximum number of users that can be supported by the first base station before the amount of radio resources in the uplink control channel region of the frames is increased.

4. The system of claim 3, wherein said second preselected number is between about 60-75% of the maximum number of users that can be supported by the first base station before the amount of radio resources in the uplink control channel region of the frames is increased.

5. The system of claim 1, wherein frequency bandwidth Y is about 50% greater than frequency bandwidth X.

6. The system of claim 1, wherein the coverage of the first base station and the coverage of the second base station geographically overlap.

7. The system of claim 1, wherein said radio communication system is one of a WiMAX and an LTE system.

8. A method for dynamically balancing a maximum number of active remote device users between first and second base stations in a radio communication system having broadcast coverage via carriers operating at radio frequency bandwidths X and Y respectively, wherein Y is substantially larger than X, and wherein the carriers of the first and second base stations transmit data frames, each of which includes an uplink control channel region and an uplink channel region, comprising:
    monitoring a number of active wireless device users within the broadcast coverage of said first base station,
    increasing an amount of radio resources in the uplink control channel region of the frames transmitted by said first base station to increase the number of users that said first base station can support to equal or at least approach a maximum number of users the second base station can support when the number of active wireless device users of the first base station exceeds a first preselected number,
    monitoring an uplink load for said first base station operating at frequency bandwidth X, and increasing the amount of radio resources in the uplink control channel region of the frames transmitted by the first base station when the number of active wireless device users exceeds said first preselected number and said uplink load is below a first preselected threshold indicative of a low load condition,
    refraining from increasing the amount of radio resources in the uplink control channel region of the frames transmitted by the first base station when the number of active wireless device users exceeds said first preselected number and said uplink load is above a second preselected threshold indicative of a high load condition, and
    increasing the amount of radio resources in the uplink control channel region of the frames transmitted by the first base station when the uplink load is between said first and second thresholds only when a number of uplink bursts transmitted for a lowest modulation control scheme divided by a total number of bursts is less than a preselected percentage and the number of active wireless device users exceeds said first preselected number.

9. The method of claim 8, further including the step of decreasing the amount of radio resources in the uplink control channel region of the frames transmitted by said first base station when the number of active wireless device users falls below a second preselected number that is lower than said first preselected number.

10. The method of claim 9, wherein said first preselected number is between about 75-85% of the maximum number of users that can be supported by the first base station before the uplink control channel region of the frames is increased.

11. The method of claim 10, wherein said second preselected number is between about 60-75% of the maximum number of users that can be supported by the first base station before the amount of radio resources in the uplink control channel region of the frames is increased.

12. A method for dynamically balancing a maximum number of active remote device users between first and second base stations in a radio communication system having broadcast coverage via carriers operating at radio frequency bandwidths X and Y respectively, wherein Y is substantially larger than X, and wherein the first and second base station carriers transmit data frames, each of which includes an uplink control channel region and an uplink channel region, comprising:

monitoring both an uplink load and a number of active wireless device users within the broadcast coverage of said first base station, increasing a number of subchannels in the uplink control channel region of the frames transmitted by said first base station to increase the number of users that said first base station can support to equal or at least approach a maximum number of users the second base station can support when the number of active wireless device users of said first base station exceeds a first preselected number and said monitored uplink load is below a first preselected threshold indicative of a low load condition, and increasing the number of subchannels in the uplink control channel region of the frames transmitted by the first base station when the uplink load is between the first preselected threshold and a second preselected threshold indicative of a high load condition only when a number of uplink bursts transmitted for a lowest modulation control scheme divided by a total number of bursts is less than a preselected percentage and the number of active wireless device users exceeds said first preselected number.

13. The method of claim 12, wherein said radio communication system is a WiMAX system, and wherein a number of symbols per frame for the uplink control channel increases when the uplink control channel region of the frames is increased.

14. The method of claim 12, wherein said radio communication system is an LTE system, and wherein a number of resource blocks (RB) per physical uplink control channel (PUCCH) increases when the uplink control channel region of the frames is increased.

* * * * *